United States Patent
Kojima

(10) Patent No.: US 8,937,785 B1
(45) Date of Patent: Jan. 20, 2015

(54) MAGNETIC DISK APPARATUS AND TOUCHDOWN DETERMINATION METHOD

(71) Applicant: Kabushiki Kaisha Toshiba, Tokyo (JP)

(72) Inventor: Shuichi Kojima, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/200,434

(22) Filed: Mar. 7, 2014

Related U.S. Application Data

(60) Provisional application No. 61/910,633, filed on Dec. 2, 2013.

(51) Int. Cl.
*G11B 21/02* (2006.01)

(52) U.S. Cl.
USPC .......................................... 360/75; 369/47.49

(58) Field of Classification Search
None
See application file for complete search history.

(56) References Cited

U.S. PATENT DOCUMENTS

| | | | |
|---|---|---|---|
| 6,396,783 B1 * | 5/2002 | Bell et al. .................. | 369/53.18 |
| 7,286,315 B2 | 10/2007 | Ryu | |
| 2006/0203376 A1 * | 9/2006 | Yoshioka et al. ............... | 360/75 |
| 2010/0225310 A1 | 9/2010 | Sudou | |
| 2011/0235207 A1 * | 9/2011 | Yang .............................. | 360/75 |
| 2011/0235208 A1 | 9/2011 | Yang | |
| 2012/0002319 A1 | 1/2012 | Kondo | |
| 2012/0120519 A1 * | 5/2012 | Kunkel et al. .................. | 360/59 |
| 2013/0250455 A1 * | 9/2013 | Zeng et al. ................. | 360/234.3 |

FOREIGN PATENT DOCUMENTS

| | | |
|---|---|---|
| JP | 2012-014788 | 1/2012 |
| JP | 4910063 | 4/2012 |

* cited by examiner

*Primary Examiner* — Paul Huber
(74) *Attorney, Agent, or Firm* — Knobbe Martens Olson & Bear LLP

(57) ABSTRACT

According to one embodiment, a magnetic disk apparatus includes a magnetic disk, a slider including a head element, a heater which heats the slider and vary a protrusion amount of the head element toward the magnetic disk, a controller which performs DFH control to vary a control amount for power applied to the heater at a fixed period of time, a sensor which outputs a signal corresponding to the protrusion amount of the head element, and a determination unit which determines a touchdown of contact between the magnetic disk and part of the slider, based on a peak value of a DC output signal of the sensor.

19 Claims, 9 Drawing Sheets

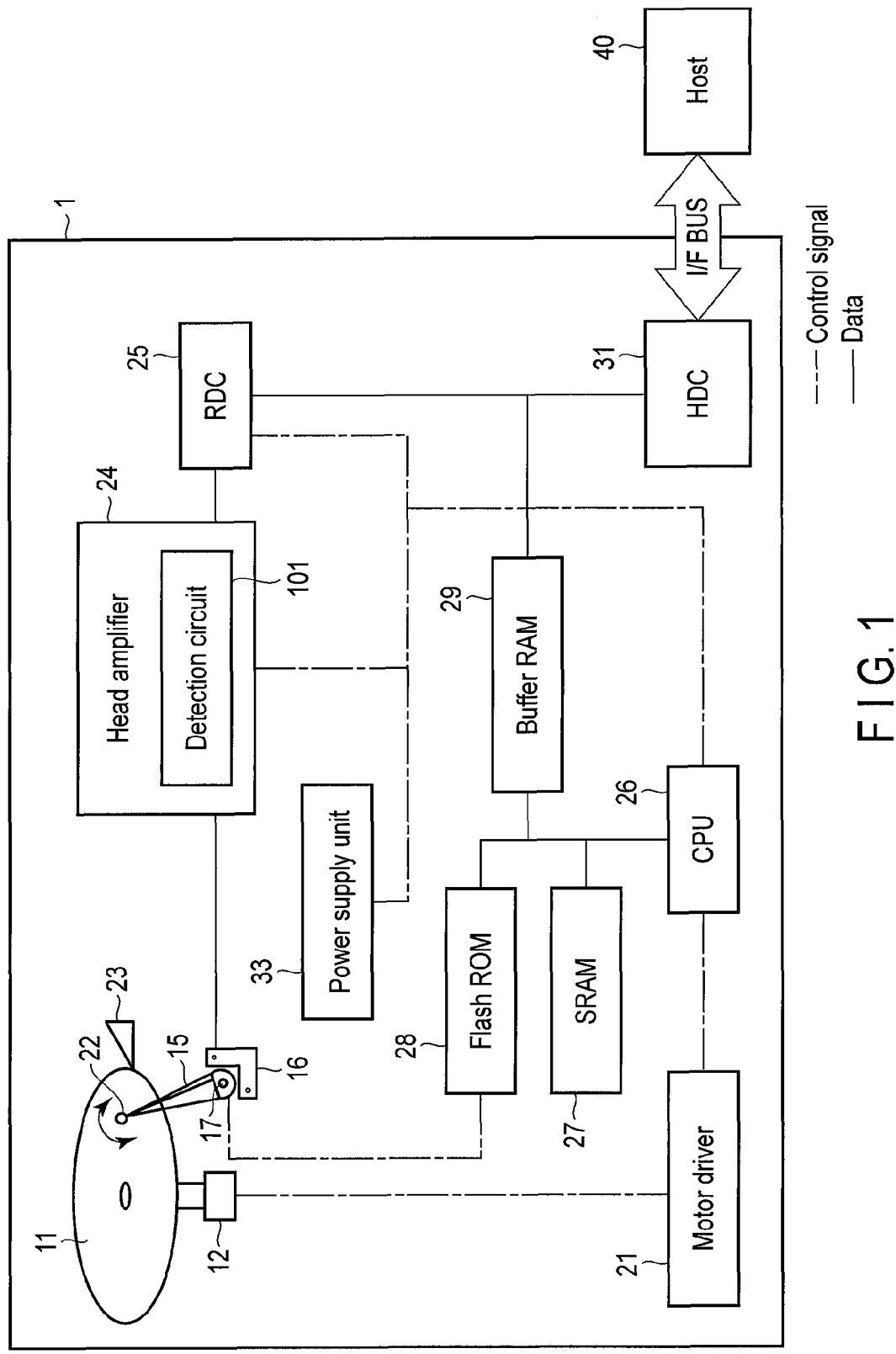
F I G. 1

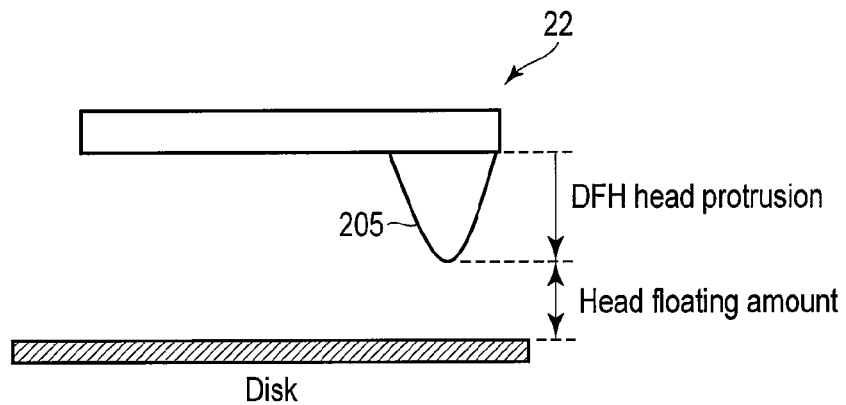
F I G. 4
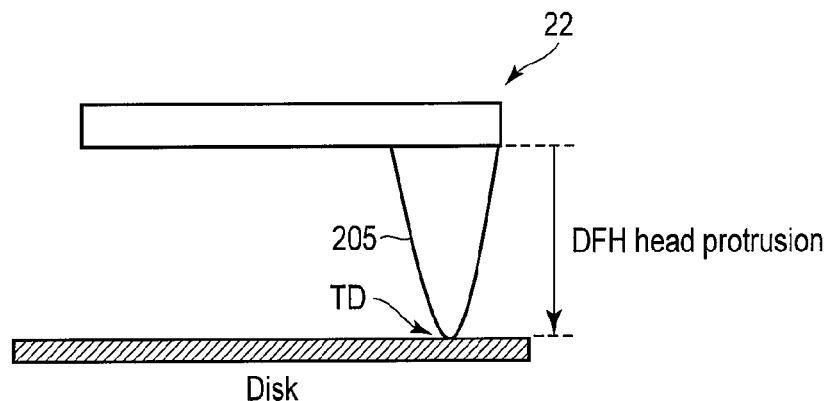
F I G. 5
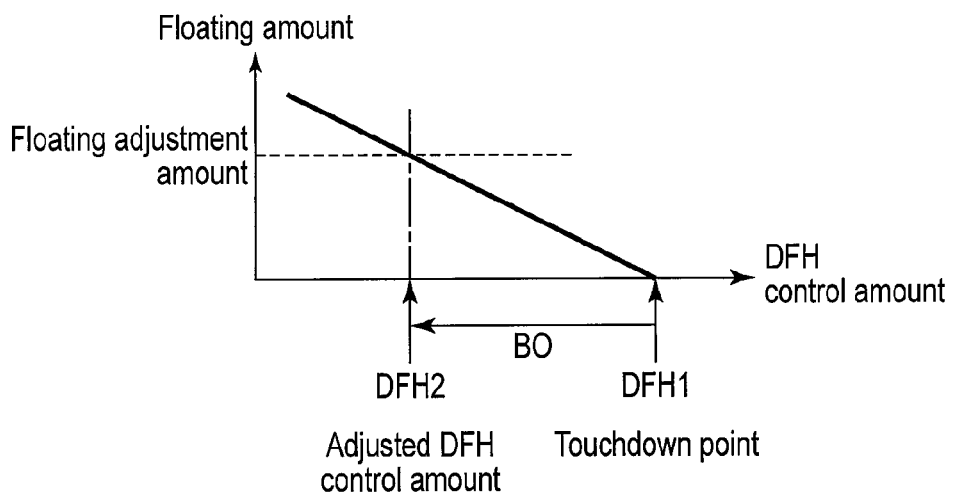
F I G. 6

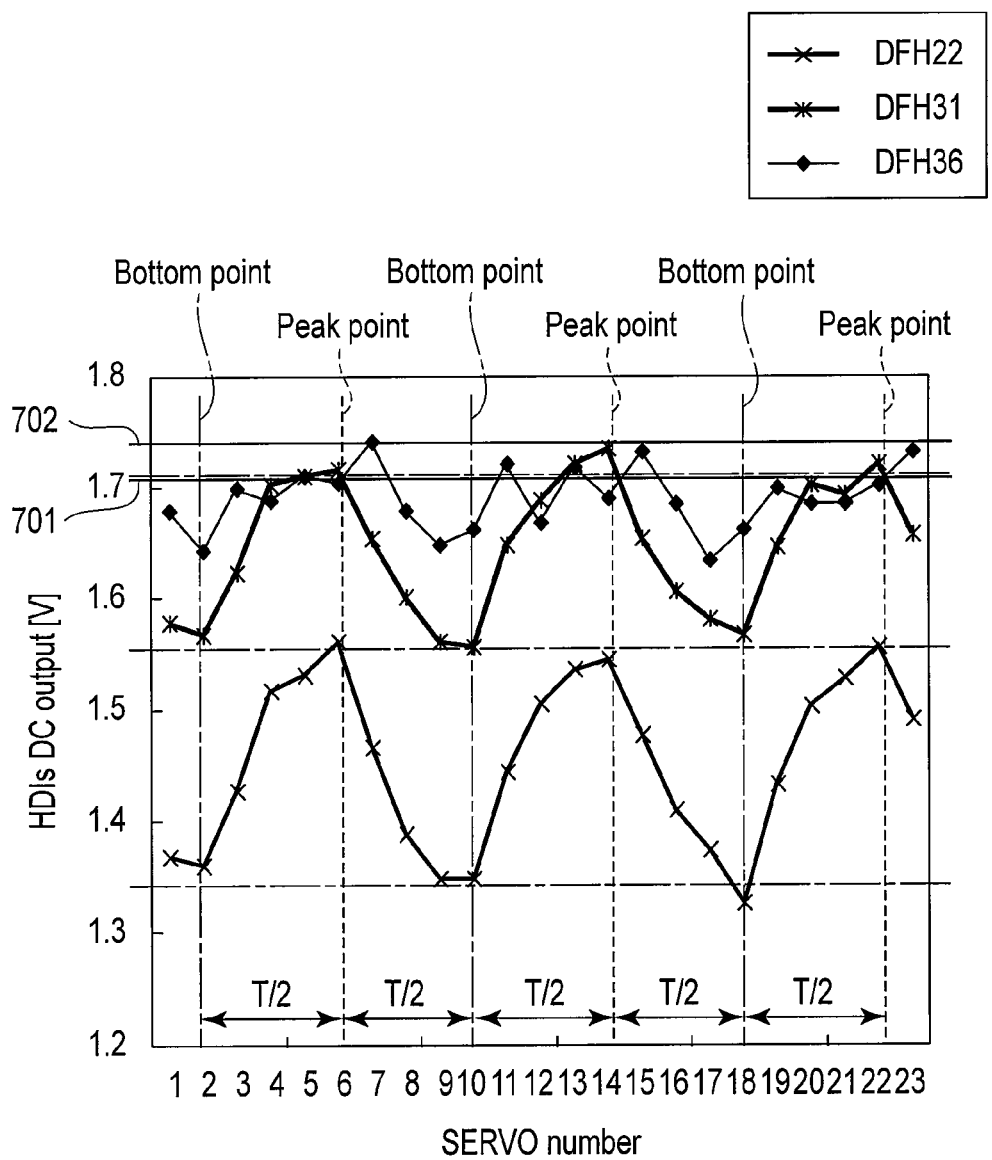
F I G. 10

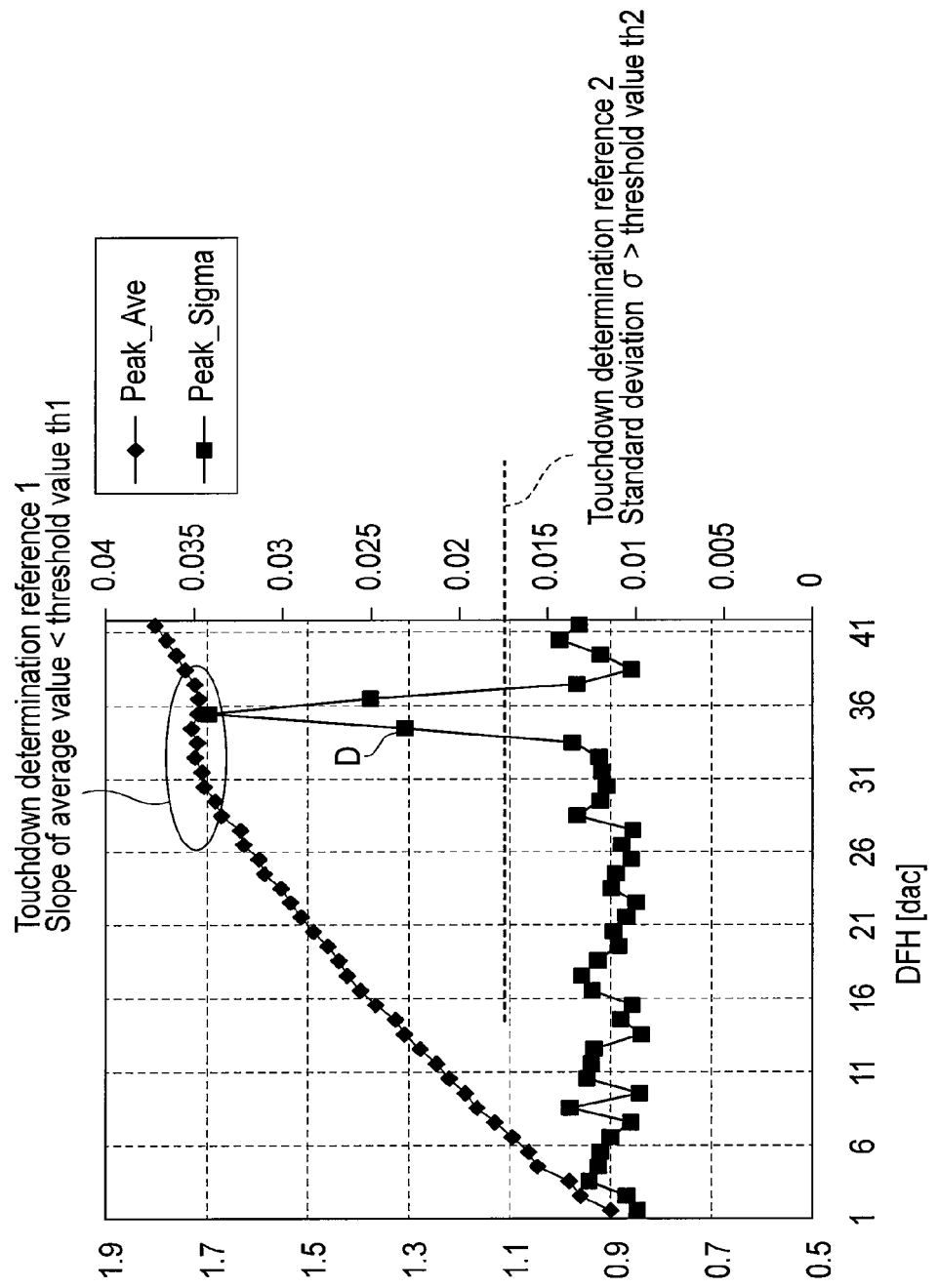
F I G. 12

MAGNETIC DISK APPARATUS AND TOUCHDOWN DETERMINATION METHOD

CROSS-REFERENCE TO RELATED APPLICATIONS

This application claims the benefit of U.S. Provisional Application No. 61/910,633, filed Dec. 2, 2013, the entire contents of which are incorporated herein by reference.

FIELD

Embodiments described herein relate generally to a magnetic disk apparatus and a touchdown determination method.

BACKGROUND

In a hard disk drive (HDD) including a magnetic disk, a magnetic head records or reads data on or from the magnetic disk with a gap between the magnetic head and the magnetic disk, or while floating over the magnetic disk. However, touchdown is likely to occur in which the magnetic head cannot be floated smoothly due to the temperature, moisture or altitude of use environment of the HDD, a portion projected from the magnetic disk or the like to bring the magnetic head into contact with the magnetic disk.

When touchdown occurs, the magnetic head floats high, its positioning decreases in accuracy or the like, thereby causing a recording error and a reading error. It is thus required to control floating the magnetic head over the magnetic disk with high accuracy to prevent touchdown from occurring under use environment of the HDD.

Conventionally, there is a touchdown detection method using an AC output of a head-disk interface (HDI) sensor. The HDI sensor is provided in a magnetic head, includes a resistive element and is able to detect touchdown by variations in resistance value of the HDI sensor. There is another touchdown detection method using servo position error information in place of the HDI sensor. In both methods, touchdown should be detected with high accuracy.

BRIEF DESCRIPTION OF THE DRAWINGS

FIG. 1 is a block diagram showing a configuration of a magnetic disk apparatus according to one embodiment;

FIG. 4 is an illustration of a concept of head floating amount control by a DFH controlling;

FIG. 5 is an illustration of a touchdown state;

FIG. 6 is an illustration of a method for detecting touchdown and controlling a head floating amount;

FIG. 10 is a graph showing the same monitor value as that of FIG. 9 with respect to DFH control amounts close to the touchdown;

FIG. 12 is a graph showing an example of the actual measurements in the touchdown determination method illustrated in FIG. 10.

DETAILED DESCRIPTION

Figure 2A:
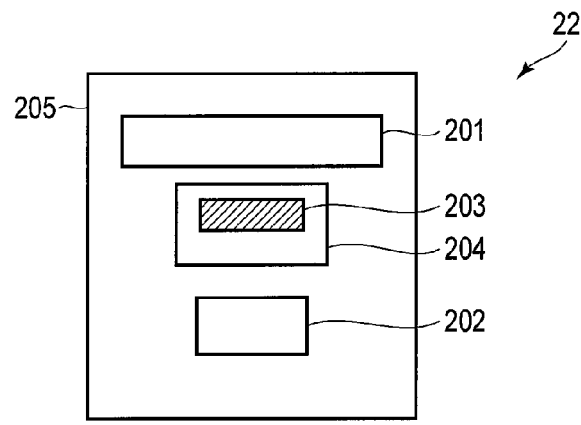
FIG. 2A is a block diagram showing a configuration of the magnetic head viewed from recording surface of the magnetic disk.

Various embodiments will be described hereinafter with reference to the accompanying drawings.

In general, according to one embodiment, a magnetic disk apparatus includes a magnetic disk, a slider, a heater, a controller, a sensor and a determination unit. The slider includes a head element configured to record or read data on or from the magnetic disk. The heater is provided in the slider and configured to heat the slider upon receipt of power and to vary a protrusion amount of the head element toward the magnetic disk by heat deformation of the slider due to heating. The controller is configured to perform DFH control to vary an amount of control over power applied to the heater at a fixed period of time. The sensor is provided in the slider and configured to output a signal corresponding to the protrusion amount of the head element, which corresponds to the DFH control. The determination unit is configured to determine a touchdown of contact between the magnetic disk and part of the slider, based on a peak value of a DC output signal that is a DC output component of the sensor, which corresponds to the DFH control.

Hereinafter, an embodiment of a magnetic disk apparatus and a touchdown determination method will be described in detail with reference to the accompanying drawings.

FIG. 1 is a block diagram showing a configuration of a magnetic disk apparatus 1 according to the present embodiment. In the present embodiment, the magnetic disk apparatus 1 comprises a housing (not shown) including, as principal components, a magnetic disk 11, a spindle motor (SPM) 12 that rotates the magnetic disk 11, a magnetic head 22, an actuator arm 15, a voice coil motor (VCM) 16 and a ramp 23.

The magnetic disk 11 is rotated by the SPM 12. The actuator arm 15 is rotatably attached to a pivot 17. The magnetic head 22 is attached to one end of the actuator arm 15, and the VCM 16 is connected to the other end of the actuator arm 15. The VCM 16 rotates the actuator arm 15 around the pivot 17 and positions the magnetic head 22 so as to float above a given location corresponding to the radius of the magnetic disk 11.

The magnetic disk apparatus 1 according to the present embodiment also includes, as electrical hardware components, a motor driver 21, a head amplifier 24, a read write channel (RDC) 25, a hard disk controller (HDC) 31, a central processing unit (CPU) 26, a random access memory (RAM) 27 serving as an operating memory, a flash read only memory (ROM) 28 of a nonvolatile memory and a temporal storage buffer RAM 29, as shown in FIG. 1.

The motor driver 21 drives the SPM 12 in response to an instruction from the CPU 26 and rotates the magnetic disk 11 on its rotation axis at a given rotational speed. The motor driver 21 drives the VCM 16 and moves the magnetic head 22 in the radial direction of the magnetic disk 11, in response to an instruction from the CPU 26.

The magnetic head 22 writes data to the magnetic disk 11 and reads data out of the magnetic disk 11.

Figure 2B:
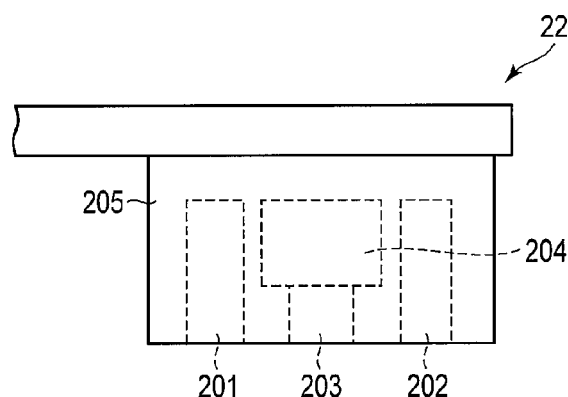
FIG. 2B is a block diagram showing a configuration of the magnetic head viewed from outer edge of the magnetic disk.

FIGS. 2A and 2B are schematic block diagrams of the magnetic head 22. FIG. 2A shows a configuration of the magnetic head 22 viewed from the recording surface of the magnetic disk 11 and FIG. 2B shows a configuration of the magnetic head 22 viewed from the outer edge of the magnetic disk 11.

As shown in FIGS. 2A and 2B, the magnetic head 22 of the present embodiment is provided with a head slider 205 including a write head 201, a read head 202, a heater 204 serving as a heating unit and an HDI sensor 203 serving an a detection unit.

The write head 201 writes data to a data area of the magnetic disk 11 by a magnetic field from its magnetic pole. The read head 202 reads a variation in magnetic field on the magnetic disk 11 to read data out of the magnetic disk 11. For example, when the magnetic disk 11 stops rotating, the magnetic head 22 is retreated onto the ramp 23 (see FIG. 1).

The HDI sensor 203 includes a resistive element 401 (not shown in FIG. 2A or 2B but shown in FIG. 3), and the resistive element 401 detects that the write head 201 or read head 202 is in contact with the magnetic disk 11.

The heater 204 receives power from a power supply unit 33 and heats the head slider 205 of the magnetic head 22. This heat deforms the head slider 205 and thus varies an amount of floating of the magnetic head 22 from the magnetic disk 11.

Returning to FIG. 1, the power supply unit 33 supplies power to the heater 204 in response to an instruction from the CPU 26. The control of an amount of floating of the magnetic head 22 due to the heating of the head slider 205 by the heater 204 will be described in detail later.

The head amplifier 24 amplifies a readout signal, which is read out of the magnetic disk 11 by the read head 202, and output the amplified signal to the RDC 25.

The head amplifier 24 includes not only the amplifying function but also a detection circuit 101 serving as a detection unit, as shown in FIG. 1. The detection circuit 101 is a circuit that detects an amount of protrusion of the head by detecting a variation in resistance of the resistive element of the HDI sensor 203. The head amplifier 24 includes a constant current source (not shown) that energizes the resistive element 401 (see FIG. 3) of the HDI sensor 203.

Figure 3:
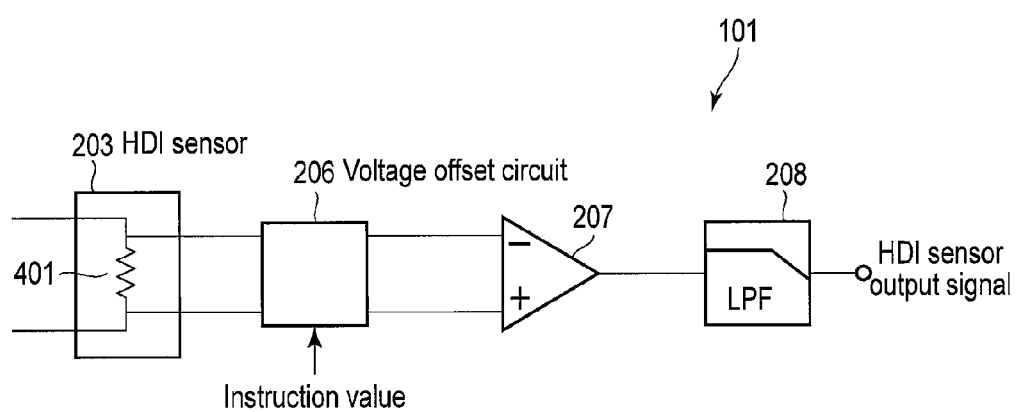
FIG. 3 is a circuit diagram schematically showing an HDI sensor and a detection circuit.

FIG. 3 is a circuit diagram schematically showing the HDI sensor 203 and the detection circuit 101. As shown in FIG. 3, the HDI sensor 203 includes the above-described resistive element 401. The resistive element 401 is connected to the constant current source in the head amplifier 24.

A signal corresponding to a voltage between terminals of the resistive element 401 is input to a voltage offset circuit 206 and its offset is adjusted based on an instruction value. The offset-adjusted signal is amplified by an amplifier 207 and noise is eliminated from the amplified signal by a low-pass filter 208. The noise-eliminated signal is provided as an HDI sensor output signal.

FIG. 4 is a conceptual diagram illustrating head floating amount control performed by DFH. The DFH is a technology of controlling an amount of floating by causing current to flow through the heater 204, which is formed adjacent to the write head 201 and read head 202, and deforming the slider 205 slightly by heat. As the DFH control amount (heater power) increases, the amount of protrusion of the magnetic head 22 (slider 205) increases, with the result that the amount of floating of the magnetic head 22 can be decreased. If the DFH control amount is adjusted appropriately, a head floating amount can be set in accordance with each of the read and write operations.

FIG. 5 is an illustration of a touchdown state. The increase in DFH control amount causes a state in which the magnetic head 22 is in contact with media (magnetic disk 11), or a touchdown state. If a fixed control amount is subtracted from the DFH control amount at the time of touchdown, an appropriate head floating amount can be obtained.

FIG. 6 is an illustration of a method for detecting touchdown and controlling a head floating amount. The head floating amount in a state of no DFH head protrusion varies from apparatus to apparatus. In order to achieve a targeted head floating amount, it is necessary to detect touchdown as shown in FIG. 5 and adjust a head floating amount on the basis of the detected touchdown. In FIG. 5, DFH1 indicates a DFH control amount that causes a touchdown state. As of this point in time, the head floating amount can be regarded as 0. In order to achieve the targeted head floating amount, a DFH control amount corresponding to control amount BO is subtracted from DFH1 to obtain control amount DFH2. The value of BO can be set as a fixed one that results from a predetermined survey on a fixed number of population, or it can be adjusted to achieve a targeted floating amount by recording a given frequency pattern in advance, analyzing the frequency component of a signal read out of a read head and comparing these amounts of the frequency component at different DFH power.

Figure 7:
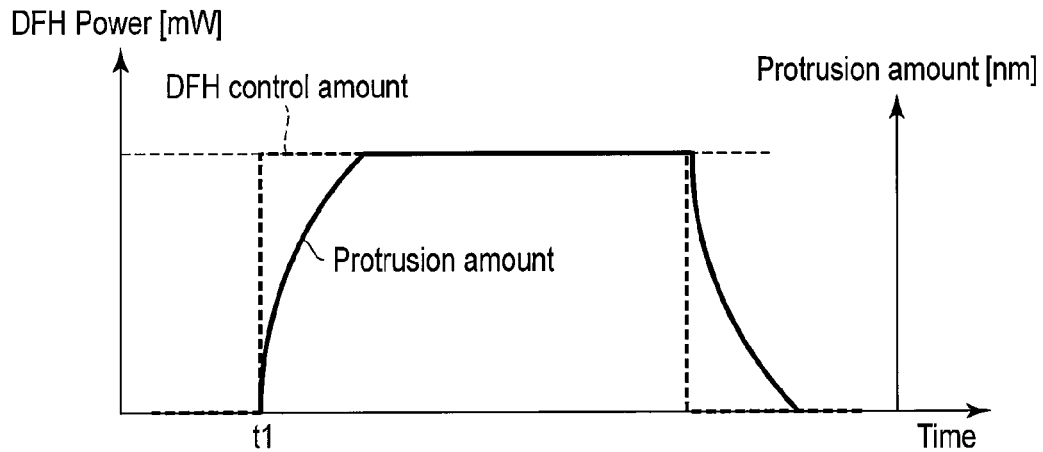
FIG. 7 is a conceptual diagram showing a relationship between DFH control amounts and actual DFH protrusion amounts.

FIG. 7 is a conceptual diagram showing a relationship between the DFH control amount and the actual DFH protrusion amount. As shown in FIG. 7, immediately after a set value of the DFH control amount (a value of DFH power) is varied at time t1, the actual DFH protrusion amount varies to have a time constant and after a lapse of a fixed period of time, a stable protrusion amount is obtained.

Figure 8:
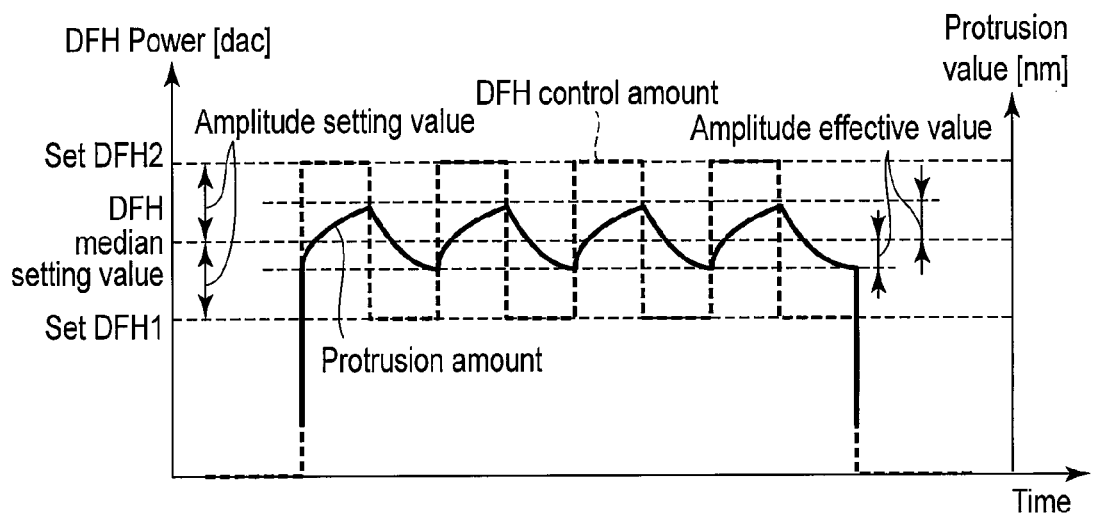
FIG. 8 is a conceptual diagram showing a relationship between DFH control amounts and actual DFH protrusion amounts in a case where heater power is pulse-controlled.

FIG. 8 is a conceptual diagram showing a relationship between a set value of the DFH control amount and the actual DFH protrusion amount in a case where heater power is pulse-controlled. The DFH control amount in this case corresponds to a pulse string with a fixed period and a given amplitude. In FIG. 8, the left-side vertical axis indicates a unit "dac" of DFH power, which is proportionate to a unit "mW" of DFH power indicated by the left-side vertical axis in FIG. 7 and which is a unit of an instruction value supplied to the power supply unit 33 from the CPU 26. Though the "dac" value ranges from 0 dac to 255 dac, for example, it is not limited to this range. The power supply unit 33 supplies the heater 204 with power corresponding to the dac value. The DFH protrusion amount varies periodically with a DFH median setting value as a median and with an amplitude effective value as an amplitude. This period coincides with the period of the pulse string of the DFH control amount. The DFH control can be performed for each servo frame.

Actually, the DFH protrusion amount should be represented by nm, but it can be converted into a DFH control amount (dac value) for the sake of brevity. The "amplitude set value" shown in FIG. 8 represents half the difference between the peak and bottom of the DFH control amount (the difference between DFH2 and DFH1), and the "amplitude effective value" represents a value corresponding to a DFH control amount into which the actual protrusion amount is converted.

Figure 9:
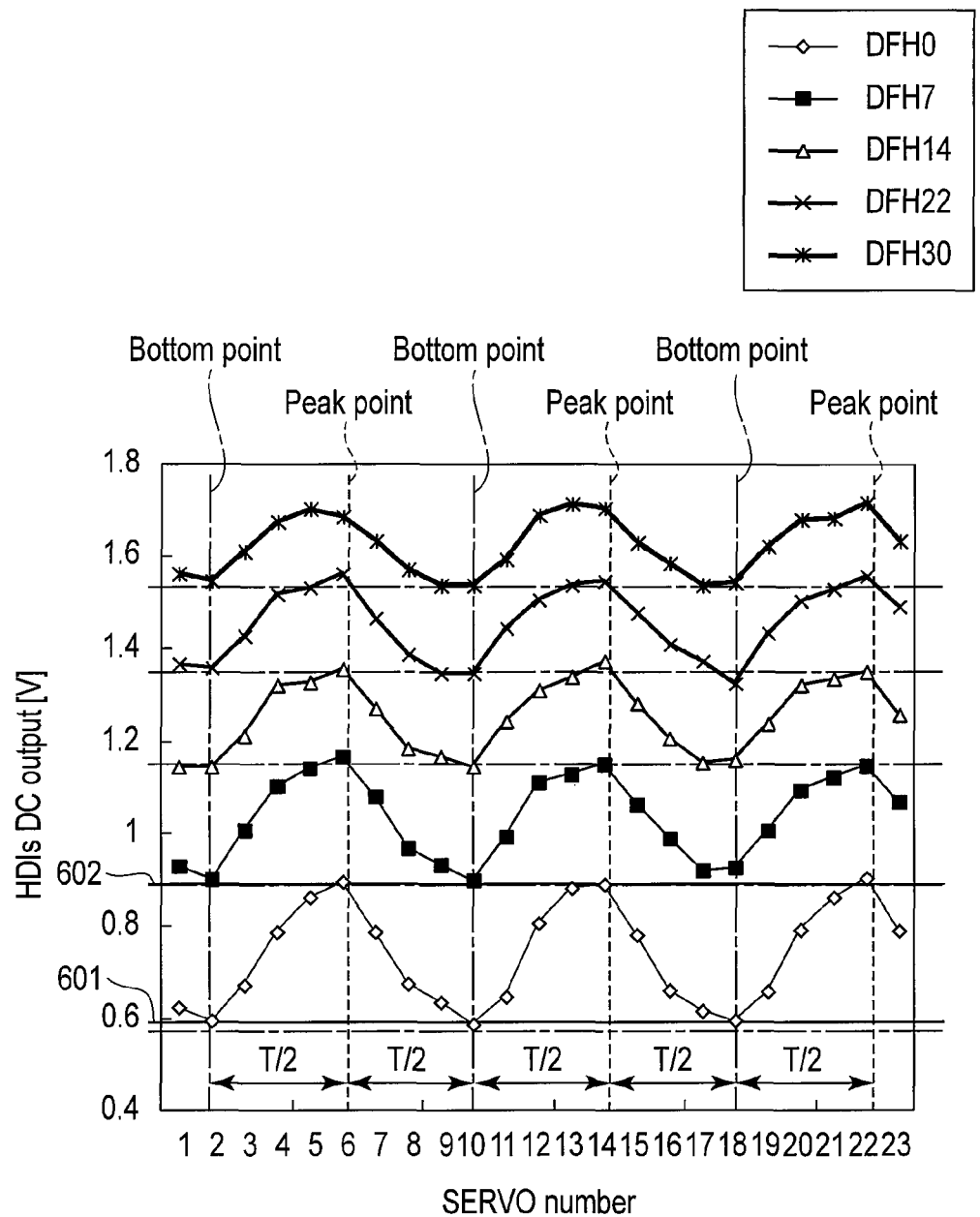
FIG. 9 is a graph showing an example of monitoring actual DFH protrusion amounts by a DC output of the HDI sensor in a case where heater power is pulse-controlled.

FIG. 9 shows an example of monitoring the actual DFH protrusion amount by a DC output of the HDI sensor (HDIs) 203 in a case where heater power is pulse-controlled. The DC output of the HDI sensor 203 corresponds to the temperature of an HDI sensor resistive element provided at the magnetic head 22. Accordingly, when the output values of the HDI sensor 203 are the same, the temperatures of the HDI sensor resistive element are the same. When no touchdown occurs, the temperature of the HDI sensor is determined uniquely by the DFH protrusion amount. Thus, when the output values of the HDI sensor are the same, the protrusion amounts are the same and, in other words, the output value of the HDI sensor corresponds to the protrusion amount of the head.

The DFH can be controlled for each servo frame and a controllable period T is a fixed multiple of a servo period. In this example, the DFH is pulse-controlled in period T that is equal to eight servo periods (the pulse period T of the DFH control amount is eight times as long as the servo frame period) when the amplitude set value is 6 dac, and the DC output of the HDI sensor 203 is monitored in a servo frame period. In FIG. 9, the legends, such as DFH0 and DFH7 indicate different DFH control amounts (which are bottom values of pulse control and correspond to the values of the set DFH1 in FIG. 8). For example, DFH0 indicates an output value of the HDI sensor when the set DFH1 is 0 dac and the amplitude set value is 6 dac.

For example, in the case of DFH0 (DFH pulse control bottom value: 0 dac), the DFH protrusion amount periodically varies with HDI sensor output 601 as the bottom average of at least one rotation of the disk and with HDI sensor output 602 as the bottom average of at least one rotation of the disk. In the case of DFH7 (DFH pulse control bottom value: 7 dac), the bottom average value coincides with the HDI sensor output 602 that is a peak average value in the case of DFH0. In other words, the peak average value of DFH0 and the bottom average value of DFH7 are the same DFH protrusion amount. This means that the amplitude effective value is 3.5 dac (=7 dac/2) in the case of DFH0.

FIG. 10 shows the same monitor value as that of FIG. 9 with respect to the DFH control amount close to the touchdown. Even though the tip of the head is intermittently brought into contact with media, the temperature of the HDI sensor is lowered by heat radiation effect and so is the output of the HDI sensor. Value 701 of the output of the HDI sensor is an average value of the outputs of the HDI sensor at the peak points of DFH 36 when the disk rotates at least once. Each of the peak points (indicated by the dotted perpendiculars in FIG. 10) represents a point in time close to the falling edge (a point of variation in level in a given direction) of a DFH control pulse as shown in FIG. 8 and a point in time at which the protrusion amount is assumed to be maximum. Value 702 of the output of the HDI sensor is an average value of the outputs of the HDI sensor at the peak points of DFH 31 when the disk rotates at least once. Therefore, FIG. 10 shows that the average of the outputs of the HDI sensor at a point in time (peak point) where the DFH protrusion amount is to be the peak in the DFH 36 is smaller than that in the DFH 31. Accordingly, touchdown can be determined. In other words, if the average of the outputs of the HDI sensor at the peak points is monitored, touchdown can be determined when the average does not vary or it decreases before and after the touchdown even though the DFH control amount is increased. If a standard deviation σ, which is a variation in the output values of the HDI sensor at the peak points when the disk rotates at least once, is computed, the DFH control amount increases, with the result that a point at which the standard deviation σ increases and exceeds a threshold value can be determined as touchdown (touchdown determination will be described later with reference to FIG. 12).

Figure 11:
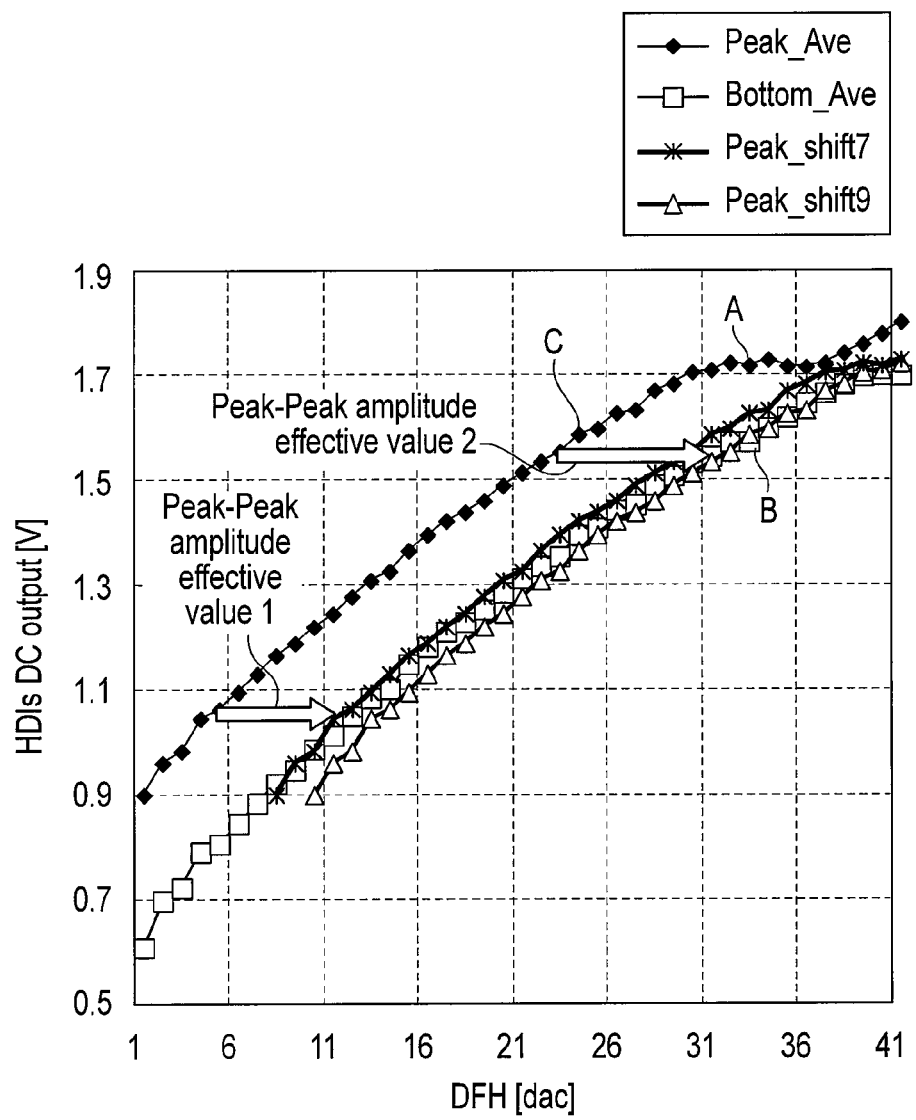
FIG. 11 is a graph showing a peak average value and a bottom average value of the output amplitudes of the HDI sensor for each of DFH control amounts.

FIG. 11 is a graph showing a peak average value (the average value of the output values of the HDI sensor at the peak points when the disk rotates at least once as shown in FIG. 10) and a bottom average value (the average value of the output values of the HDI sensor at the bottom points when the disk rotates at least once as shown in FIG. 10) of the output amplitudes of the HDI sensor for each of DFH control amounts. Each of the bottom points (indicated by the one-dot-one-dash perpendiculars in FIG. 10) represent a point in time close to the leading edge (a point of variation in level in a direction opposite to the above given direction) of a DFH control pulse as shown in FIG. 8 and a point in time at which the protrusion amount is assumed to be minimum. The amplitude effective value of each of the DFH control amounts is obtained by checking how many DAC the peak average value is shifted to make the difference between the peak average value and the bottom average value zero or minimum, as shown in FIG. 11. In FIG. 11, Peak_shift7 indicates a curve that is obtained by shifting the curve of the peak average value by 7 dac in the right direction (direction in which the DFH control amount increases), and Peak_shift9 indicates a curve that is obtained by shifting the curve of the peak average value by 9 dac in the right direction. If the Peak_Peak amplitude effective value is divided by two, an amplitude effective value is obtained. For example, in the case of amplitude effective value 1 in FIG. 11, when the DFH control amount is 12 (the set DFH1 is 12 dac and the amplitude set value is 6 dac in FIG. 8), the amplitude Peak-Peak value is 7 dac, or the amplitude effective value is 3.5 dac (=7 dac/2). In the case of amplitude effective value 2, when the DFH control amount is 32 (the set DFH1 is 32 dac and the amplitude set value is 6 dac in FIG. 8), the amplitude Peak-Peak value is 9 dac, or the amplitude effective value is 4.5 dac (=9 dac/2). The amplitude effective value is computed as half the difference between two DFH control amounts in the same HDI output value by comparing the bottom average value with an HDI sensor peak average value previously measured for DFH control amount.

FIG. 12 is a graph showing an example of the actual measurements in the touchdown determination method illustrated in FIG. 10. In FIG. 12, the "slope of average value" is a slope of the line connecting the average values of the output values of the HDI sensor at the peak points for each of the DFH control amounts when the DFH control amount increases by a given amount (which is not limited to a fixed amount). If the slope of average value is smaller than a predetermined threshold value th1, touchdown is determined. In FIG. 12, a "standard deviation σ" represents a variation in the output values of the HDI sensor at the peak points for each of the DFH control amounts when the disk rotates at least once. In FIG. 12, touchdown is determined at a measurement point D where the standard deviation σ exceeds a predetermined threshold value th2.

Figure 13:
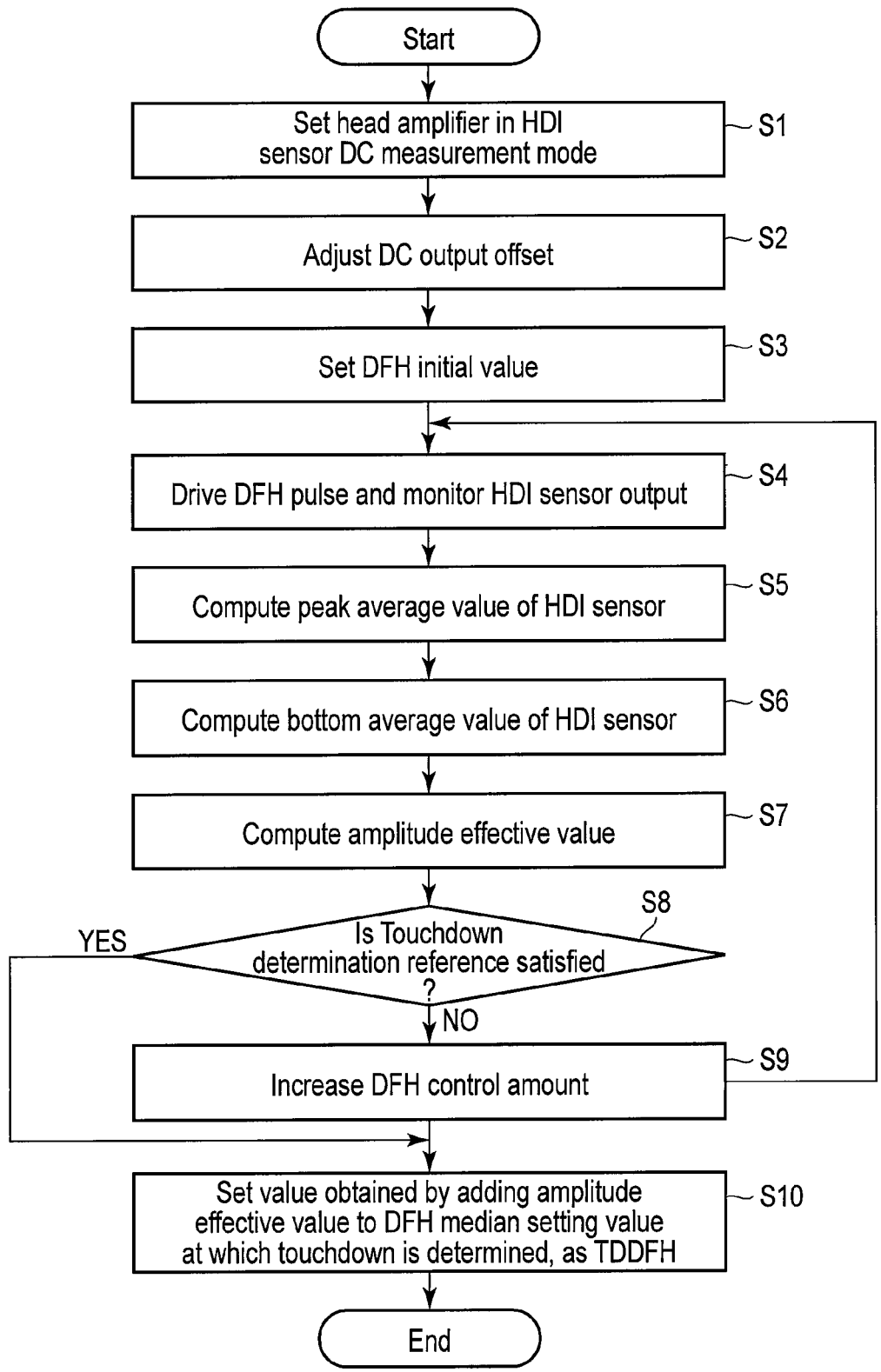
FIG. 13 is a flowchart showing a process of pulse-controlling a DFH protrusion amount and detecting touchdown by the HDI sensor.

FIG. 13 is a flowchart showing a process of controlling a DFH protrusion amount and detecting touchdown by the HDI sensor. The process shown in the flowchart is performed under the control of the CPU 26.

First, in step S1, the head amplifier 24 is set in an HDI sensor DC measurement mode. Next, in step S2, the DC output offset of the detection circuit 101 is adjusted. The HDI sensor output signal of the detection circuit 101 is sent to an ADC (not shown) and monitored. The input range of the ADC has an upper limit and a lower limit and thus the voltage of the HDI sensor output signal needs to fall within the input range of the ADC. As the instruction value of a DFH control amount increases in the process of measurement, the temperature of the HDI sensor increases and so does the resistance value thereof. In other words, when the voltage of the HDI sensor output signal increases and reaches the input upper limit of the ADC, the output of the ADC is saturated and thus cannot be monitored correctly. In step S2, therefore, the instruction value of the voltage offset circuit 206 shown in FIG. 3 is adjusted such that the voltage of the HDI sensor output signal is set to equal to or lower than the lower limit, thereby preventing the ADC output from being saturated in the process of measurement.

In step S3, a DFH initial value is set. The DFH set value increases by a fixed amount from the initial value and touchdown is determined in the process of measuring an HDI sensor output signal. The initial value for starting measurement needs to be considerably smaller than the DFH set value at which touchdown occurs. If the range of the DFH set value at which touchdown occurs is known in advance, the DFH initial value can be changed in accordance with the range of the DFH set value. In other words, if the DFH set value at which touchdown occurs is sufficiently large, the DFH set value can be set at a large value to shorten measurement time. If the DFH set value at which touchdown occurs is unknown or it is seen that the value is small, it is desirable that the initial value should be zero or a settable minimum value.

In step S4, the CPU 26 supplies a pulse-like DFH control instruction value as shown in FIG. 8 to the power supply unit 33 and monitors the HDI sensor output signal of the detection circuit 101. In steps S5 and S6, a peak average value and a bottom average value of output values of the HDI sensor are computed for each of the DFH control amounts, as shown in FIG. 11. In this case, the same DFH control instruction value for one or more rotation of the disk is supplied to the power supply unit 33, the HDI sensor output value is monitored, thus computing a peak average value and a bottom average value.

In step S7, an amplitude effective value is computed. As described above with reference to FIG. 11, the amplitude effective value is obtained by comparing a bottom average value for a DFH set value and an HDI sensor peak average value for a premeasured DFH control amount and computed as half the difference in DFH control amount between the bottom average value and the HDI sensor peak average value in the same HDI sensor output value.

In step S8, as described with reference to FIG. 12, it is determined that touchdown has occurred if the slope of an average value of output values of the HDI sensor at the peak points is smaller than a predetermined threshold value th1 as a touchdown determination reference or if a standard variation σ in the output values of the HDI sensor at the peak points when the disk rotates at least once exceeds a predetermined threshold value th2 as a touchdown determination reference.

When the touchdown determination reference is not satisfied (No in step S8), the DFH control amount is increased as in step S9, the flow returns to step S4, and the process of steps S4 through S8 is performed again. In contrast, when the touchdown determination reference is satisfied (Yes in step S8), the flow moves to step S10.

In step S10, a value obtained by adding the amplitude effective value computed in step S7 to the DFH median setting value at which touchdown is determined is regarded as a DFH control value which cause TD (TDDFH). Assume that touchdown is determined at point A where the peak average value is lowered in FIG. 11, for example. Assume that the DFH control amount is, for example, 34 dac. Assume, in this case, the bottom average value is shown at point B and the output value of the HDI sensor is, for example, 1.55 V. A difference in DFH control value between the peak average value (point C) and a bottom average value (point B), which are substantially the same as the output value 1.55 V of the HDI sensor, is 9 dac as indicated by the curve of Peak-Shift9. In this case, therefore, the Peak-Peak value of the amplitude is 9 dac and the amplitude effective value is 4.5 dac (9 dac/2). The DFH median setting value is 40 dac which is obtained by adding, for example, 6 dac (half the pulse amplitude of a DFH control amount) to DFH 34 dac, and a value 44.5 dac, which is obtained by adding the amplitude effective value 4.5 dac to the DFH median setting value 40 dac, is a DFH control value when touchdown is determined.

The touchdown determination method not only employs the above-described HDI sensor but also can be combined with a method for determining touchdown when a pulse frequency component such as a servo position error signal and a VCM current value exceeds a fixed value.

As described above, according to the above embodiment, when the DFH protrusion amount is controlled by a pulse string DFH control amount, it can be monitored in response to an HDI output signal and touchdown can be determined.

Furthermore, according to the above embodiment, an amplitude effective value of the DFH protrusion amount can be computed and an offset value can be estimated in the process of detecting touchdown under the DFH pulse control. Therefore, a correct DFH control value is obtained even when there is a difference in offset amount for each individual head. Moreover, simultaneous measurements can be performed using a touchdown determination index using an HDI sensor even in a measurement position where the skew of a head is close to zero.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
   a magnetic disk;
   a slider including a head element configured to record or read data on or from the magnetic disk;
   a heater provided in the slider and configured to heat the slider upon receipt of power and to vary a protrusion amount of the head element toward the magnetic disk by heat deformation of the slider due to heating;
   a controller configured to perform DFH control to vary a control amount for power applied to the heater at a fixed period of time;
   a sensor provided in the slider and configured to output a signal corresponding to the protrusion amount of the head element, which corresponds to the DFH control; and
   a determination unit configured to determine a touchdown of contact between the magnetic disk and part of the slider, based on a peak value of a DC output signal that is a direct current output component of the sensor, which corresponds to the DFH control,
   wherein the control amount for the DFH control includes a pulse string of the fixed period of time and a predetermined amplitude, and the determination unit determines the touchdown, based on values at peak points of the output signal of the sensor which are close to points of variation in level in a predetermined direction of the pulse string, respectively.

2. The apparatus of claim 1, wherein the determination unit determines the touchdown, based on a peak average value that is an average value of values of output signal of the sensor at the peak points while the magnetic disk rotates at least once.

3. The apparatus of claim 2, wherein the determination unit computes the peak average value for each of DFH control amounts, while increasing the DFH control amount by a predetermined amount, and determines that the touchdown has occurred when a slope of a variation in the peak average values, which corresponds to an increase in the DFH control amount, falls below a predetermined threshold value.

4. The apparatus of claim 1, wherein the determination unit determines the touchdown, based on a variation in the values of output signal of the sensor at the peak points while the magnetic disk rotates at least once.

5. The apparatus of claim 1, wherein the determination unit computes a variation of values of output signal of the sensor at the peak points for each of DFH control amounts while the magnetic disk rotates at least once, while increasing the DFH control amount by a predetermined amount, and determines that the touchdown has occurred when the variation, which corresponds to an increase in the DFH control amount, exceeds a predetermined threshold value.

6. The apparatus of claim 3, wherein the determination unit includes:
   a unit configured to compute, as a bottom average value, an average value of values of output signal of the sensor at bottom points which are close to points of a variation in level in a direction opposite to the predetermined direction of the pulse string, respectively, while the magnetic disk rotates at least once;
   a unit configured to compute the bottom average value for each of DFH control amounts, while increasing the DFH control amount by a predetermined amount; and
   a unit configured to compare a bottom average value for DFH control amount when the determination unit determines that the touchdown has occurred and a peak average value having a value of an output signal of the sensor whose level is equal to that of the bottom average value and to compute half of a difference in DFH control amount between the bottom average value and the peak average value as an amplitude effective value at a time of the touchdown.

7. The apparatus of claim 5, wherein the determination unit includes:
   a unit configured to compute, as a bottom average value, an average value of values of output signal of the sensor at bottom points which are close to points of a variation in level in a direction opposite to the predetermined direction of the pulse string, respectively, while the magnetic disk rotates at least once;
   a unit configured to compute the bottom average value for each of DFH control amounts, while increasing the DFH control amount by a predetermined amount; and
   a unit configured to compare a bottom average value for DFH control amount when the determination unit determines that the touchdown has occurred and a peak average value having a value of an output signal of the sensor whose level is equal to that of the bottom average value and to compute half of a difference in DFH control amount between the bottom average value and the peak average value as an amplitude effective value at a time of the touchdown.

8. The apparatus of claim 6, wherein the determination unit determines a value obtained by summing median value of the DFH control amount by which the determination unit determines that a touchdown has occurred and the amplitude effective value at a time of the touchdown, as a DFH control value of the touchdown.

9. The apparatus of claim 7, wherein the determination unit determines a value obtained by summing median value of the DFH control amount by which the determination unit determines that a touchdown has occurred and the amplitude effective value at a time of the touchdown, as a DFH control value of the touchdown.

10. A touchdown determination method for a magnetic disk apparatus including a magnetic disk, a slider including a head element configured to record or read data on or from the magnetic disk, a heater provided in the slider and configured to heat the slider upon receipt of power and to vary a protrusion amount of the head element toward the magnetic disk by heat deformation of the slider due to heating, and a sensor provided in the slider and configured to output a signal corresponding to the protrusion amount of the head element, which corresponds to DFH control to vary a control amount for power applied to the heater at a fixed period of time,
   the method comprising:
   performing the DFH control; and
   determining a touchdown of contact between the magnetic disk and part of the slider, based on a peak value of a DC output signal that is a direct current output component of the sensor, which corresponds to the DFH control,
   wherein the control amount for the DFH control includes a pulse string of the fixed period of time and a predetermined amplitude, and
   the method further comprises determining the touchdown, based on values at peak points of the output signal of the sensor which are close to points of a variation in level in a predetermined direction of the pulse string, respectively.

11. The method of claim 10, further comprising determining the touchdown, based on a peak average value that is an average value of values of output signal of the sensor at the peak points while the magnetic disk rotates at least once.

12. The method of claim 11, further comprising computing the peak average value for each of DFH control amounts, while increasing the DFH control amount by a predetermined amount, and determining that the touchdown has occurred when a slope of a variation in the peak average values, which corresponds to an increase in the DFH control amount, falls below a predetermined threshold value.

13. The method of claim 10, further comprising determining the touchdown, based on a variation in the values of output signal of the sensor at the peak points while the magnetic disk rotates at least once.

14. The method of claim 10, further comprising computing a variation of values of output signal of the sensor at the peak points for each of DFH control amounts while the magnetic disk rotates at least once, while increasing the DFH control amount by a predetermined amount, and determining that the touchdown has occurred when the variation, which corresponds to an increase in the DFH control amount, exceeds a predetermined threshold value.

15. The method of claim 12, further comprising:
   computing, as a bottom average value, an average value of values of output signal of the sensor at bottom points which are close to points of a variation in level in a direction opposite to the predetermined direction of the pulse string, respectively, while the magnetic disk rotates at least once;
   computing the bottom average value for each of DFH control amounts, while increasing the DFH control amount by a predetermined amount; and
   comparing a bottom average value for DFH control amount when it is determined that the touchdown has occurred and a peak average value having a value of an output signal of the sensor whose level is equal to that of the bottom average value and computing half of a difference in DFH control amount between the bottom average value and the peak average value as an amplitude effective value at a time of the touchdown.

16. The method of claim 14, further comprising:
  computing, as a bottom average value, an average value of values of output signal of the sensor at bottom points which are close to points of a variation in level in a direction opposite to the predetermined direction of the pulse string, respectively, while the magnetic disk rotates at least once;
  computing the bottom average value for each of DFH control amounts, while increasing the DFH control amount by a predetermined amount; and
  comparing a bottom average value for DFH control amount when it is determined that the touchdown has occurred and a peak average value having a value of an output signal of the sensor whose level is equal to that of the bottom average value and computing half of a difference in DFH control amount between the bottom average value and the peak average value as an amplitude effective value at a time of the touchdown.

17. The method of claim 15, further comprising determining a value obtained by summing median value of the DFH control amount by which it is determined that a touchdown has occurred and the amplitude effective value at a time of the touchdown, as a DFH control value of the touchdown.

18. The method of claim 16, further comprising determining a value obtained by summing median value of the DFH control amount by which it is determined that a touchdown has occurred and the amplitude effective value at a time of the touchdown, as a DFH control value of the touchdown.

19. A touchdown determination method for a magnetic disk apparatus including a magnetic disk, a slider including a head element configured to record or read data on or from the magnetic disk, a heater provided in the slider and configured to heat the slider upon receipt of power and to vary a protrusion amount of the head element toward the magnetic disk by heat deformation of the slider due to heating, and a sensor provided in the slider and configured to output a signal corresponding to the protrusion amount of the head element, which corresponds to DFH control to vary a control amount for power applied to the heater at a fixed period of time,
  the method comprising:
  performing the DFH control; and
  determining a touchdown of contact between the magnetic disk and part of the slider, based on a peak value of a DC output signal that is a direct current output component of the sensor, which corresponds to the DFH control,
  wherein the control amount for the DFH control includes a pulse string of the fixed period of time and a predetermined amplitude.

* * * * *